United States Patent [19]

Shaughnessy et al.

[11] Patent Number: 5,530,915
[45] Date of Patent: Jun. 25, 1996

[54] METHOD FOR DETERMINING AND UTILIZING SIMULCAST TRANSMIT TIMES BY MASTER TRANSCEIVER

[75] Inventors: Mark L. Shaughnessy, Algonquin; Richard Ng; Gary W. Grube, both of Palatine, all of Ill.

[73] Assignee: Motorola, Inc., Schaumburg, Ill.

[21] Appl. No.: 68,879

[22] Filed: May 28, 1993

Related U.S. Application Data

[63] Continuation-in-part of Ser. No. 23,982, Feb. 26, 1993.
[51] Int. Cl.⁶ .................................................. H04B 1/00
[52] U.S. Cl. ...................... 455/51.2; 455/13; 455/53.1; 455/67.1; 455/54.1; 375/356
[58] Field of Search .................... 455/51.2, 51.1, 455/54.1, 54.2, 33.1, 67.1, 67.6, 69, 53.1, 18; 375/107, 109, 110, 356, 358, 359

[56] References Cited

U.S. PATENT DOCUMENTS 4,850,032  7/1989  Freeburg ............................. 455/51.2
5,280,629  1/1994  Lo Galbo et al. .................... 455/51.2

Primary Examiner—Reinhard J. Eisenzopf
Assistant Examiner—Doris To
Attorney, Agent, or Firm—James A. Coffing

[57] ABSTRACT

Determining transmit time of a received signal in a simulcast multi-site communication system begins when a communication unit transmits a message to one or more network receivers. The receivers transport the received signal with a time stamp to a master transceiver in the network via a digital communication network. The master transceiver then determines a launch time for transmission of a selected received signal, wherein the launch time is based on a previously executed procedure to determine the inbound and outbound delays in the simulcast multi-site communication system. Finally, the master transceiver transports the selected received signal with the launch time to other transceivers assigned to the call, wherein the transceivers transmit the selected received signal at the launch time.

6 Claims, 4 Drawing Sheets

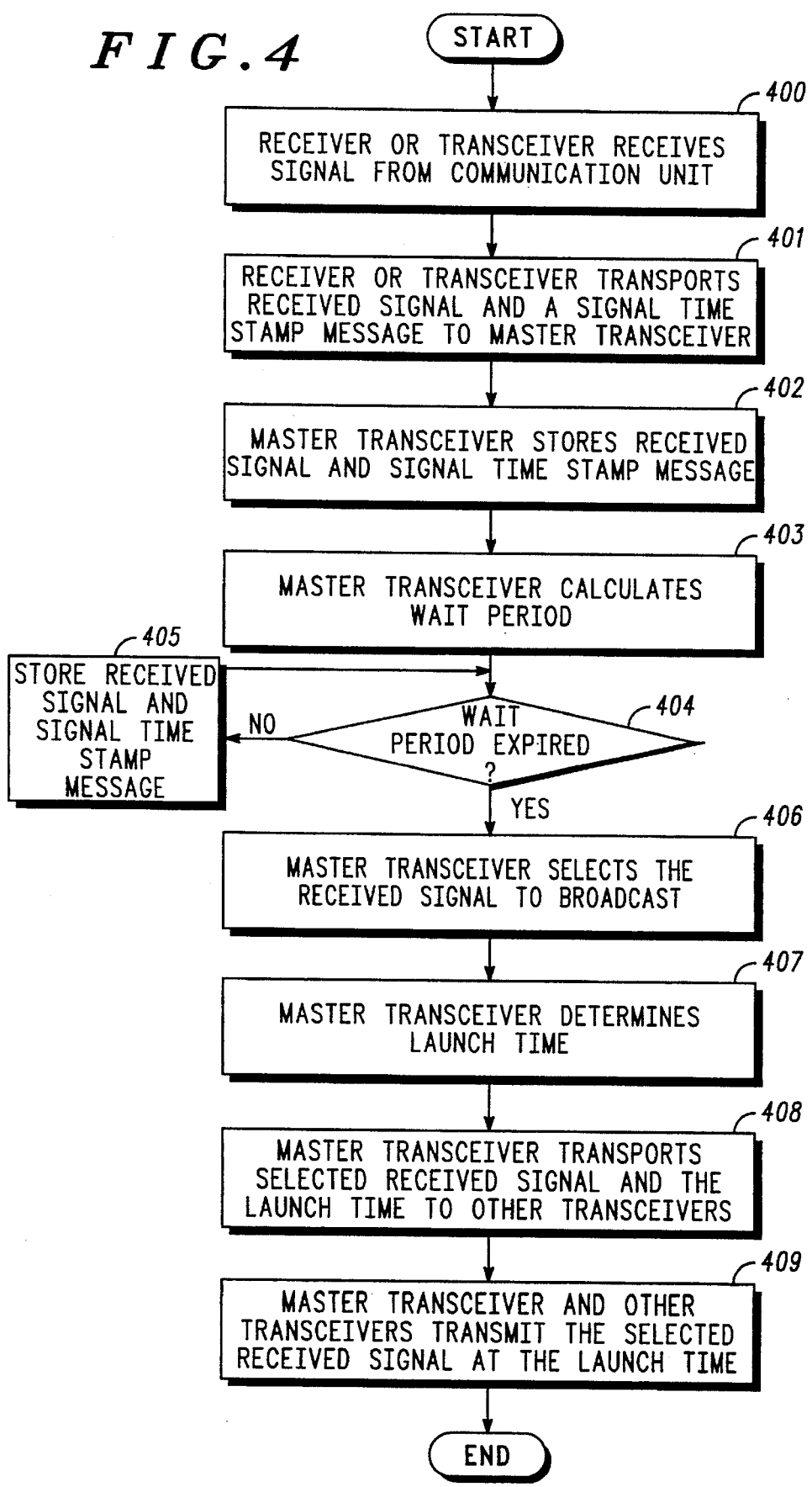

METHOD FOR DETERMINING AND UTILIZING SIMULCAST TRANSMIT TIMES BY MASTER TRANSCEIVER

This is a continuation-in-part of co-pending patent application having a filing date of Feb. 26, 1993, U.S. patent application Ser. No. 08/023,982, and is entitled "Simulcast Group Determination of Best Signal by Master Site".

FIELD OF THE INVENTION

This invention relates generally to communication systems and, in particular, to simulcast communication systems.

BACKGROUND OF THE INVENTION

The basic operation and structure of land mobile radio communication systems are known. Such radio communication systems typically comprise a plurality of communication units (vehicle mounted or portable radios in a land mobile system and radio/telephones in a cellular system), a predetermined number of transceivers, which are located throughout a geographic region and transceive information via communication channels, and a controlling entity. The controlling entity may either be a centralized call processing controller or it may be a network of distributed controllers working together to establish communication paths for the communication units. The communication channels may be time division multiplex (TDM) slots, carrier frequencies, pairs of carrier frequencies or other radio frequency (RF) transmission mediums. A frequency or time portion of one or more of the communication channels may be established for call control purposes such that a communication unit may communicate with the system controller to request and receive system resources.

Multiple site communication systems which comprise a plurality of receivers and transceivers that are distributed throughout a large geographic region are also known. Many multi-site systems use same-frequency simulcast, wherein the same communication channel (or carrier frequency) is used by multiple sites throughout the region to simultaneously relay communications to communication units that are located throughout the multi-site system.

A typical transceiver in a simulcast multi-site communication system comprises an individual circuit that couples the repeater to a central radio system audio collection and distribution point (prime site). Each transceiver receives signals on the same frequency and transports the signals to the prime site where a single signal comparator selects the best signal from all the sites. (Note that a site in the multi-site system may contain a transceiver, i.e. transmitter and receiver, or only a receiver.) The signal selected as the best is distributed from the prime site on links back to the transceiver sites for simultaneous re-transmission. To accurately re-transmit the best signal, dedicated, stable, and time-invariant links have traditionally been used. In such cases, a dedicated (non-switched) link carries messages transmitted between the prime site and each remote site. The link is thus part of a "star" topology network configuration, where the prime site constitutes the center of the star. The links may be analog and/or digital microwave channels. (Note that digital switching networks, for example those provided by public switched telephone setwork (PSTM) operators, have not been used in the past as links because they are not time-invariant.)

With the dedicated, stable, and time invariant links, the site transmitters can re-broadcast the best signal in phase, in time, and on the same frequency such that received signal distortion in overlapping site coverage areas is minimal. The stability of the links ensure that the resulting simulcasted signals remain within acceptable tolerances.

To account for the difference in the physical link transport time delays between the prime site and remote site transmitters, additional adjustable delay circuits are typically added to the links. The adjustable delay circuits compensate for the differences in physical link delay such that the total delay is the same at each transceiver site. This ensures that the signal for transmission arrives at each transceiver site at the exact same time. The adjustable time delay devices added to the transmission distribution links may be at the prime or remote sites.

To accommodate for fluctuations in physical link delays, circuits have been devised to manually or automatically adjust the adjustable time delay circuits. Typically, the channel must be excluded from service while a closed loop test is performed to measure and adjust the delay.

Many users of a simulcast system need immediate and constant access to their system channels. For these users, disabling a channel to conduct a closed loop test is inconvenient at best and potentially catastrophic. Such is certainly the case for Public Safety users and centralized controller systems. In a centralized controller system, if the centralized controller is cut off from the system due to a channel being down, communication units cannot communicate. To avoid this, some systems include duplicate prime site equipment, which involves added logic and switching functions that slows the switch-over process.

Recent technological advances allow time-variant delay links, such as those provided by public digital switching networks, to be used in simulcast systems. To account for the time variations in the links, a maximum delay time is chosen. This allows the user to take advantage of the lower costs in using time varying links but at the cost of system efficiency. A further drawback results because the links are often re-routed in digital networks due to traffic overload or failures. The new route may take a completely different path through different links and switches, even through Earth orbit satellites, and thus have a significantly different delay that exceeds the chosen maximum delay.

Therefore, a need exists for a multi-site simulcast communication system that can efficiently utilize time-invariant or time-variant distribution links, and automatically choose transmitter launch times, without the requirement of a dedicated prime site, on a per call basis.

BRIEF DESCRIPTION OF THE DRAWINGS

FIG. 4 illustrates a flow diagram for processing received signals in the master transceiver and remote site transceivers in accordance with the present invention.

DESCRIPTION OF A PREFERRED EMBODIMENT

Figure 1:
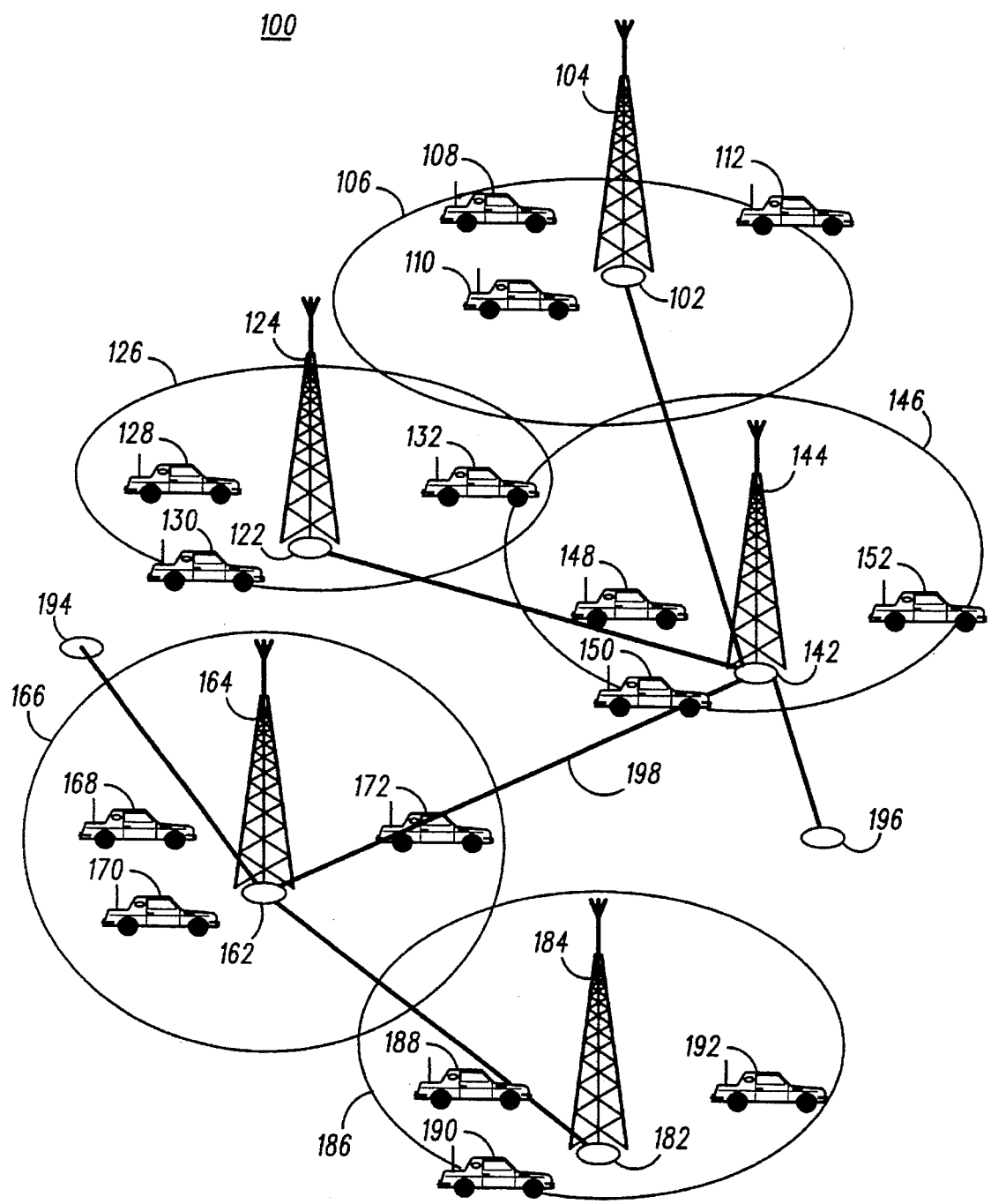
FIG. 1 illustrates a multi-site communication system that provides radio communication between communication units in accordance with the present invention.

FIG. 1 illustrates a multi-site simulcast communication system 100 that comprises network nodes, or sites, 102, 122,

142, 162, 182, 194, and 196 (7 shown), vehicle mounted communication units 108, 110, 112, 128, 130, 132, 148, 150, 152, 168, 170, 172, 188, 190, and 192 (15 shown), repeaters 104, 124, 144, 164, and 184 (5 shown), and sites having respective coverage areas 106, 126, 146, 166, and 186 (5 shown). FIG. 1 depicts overlapping coverage areas of sites such that there is a seamless operating area. The sites are linked together in a non-star digital communication network 198, such that every site is connected to every other site, although not necessarily by a direct path. The typical star configuration of prior art simulcast systems is unnecessary although the present invention could be incorporated in a star configuration. Further, some of the sites (102, 122, 142, 162, and 182) include repeaters to provide radio coverage areas, while other sites (194 and 196) do not. The sites without repeaters may be interconnected to consoles at dispatch centers which are not co-located at repeater sites, or they may simply be composed of a single call processing controller. (Note that a repeater may include a transceiver, i.e. a receiver and transmitter, or just a receiver.)

Figure 2:
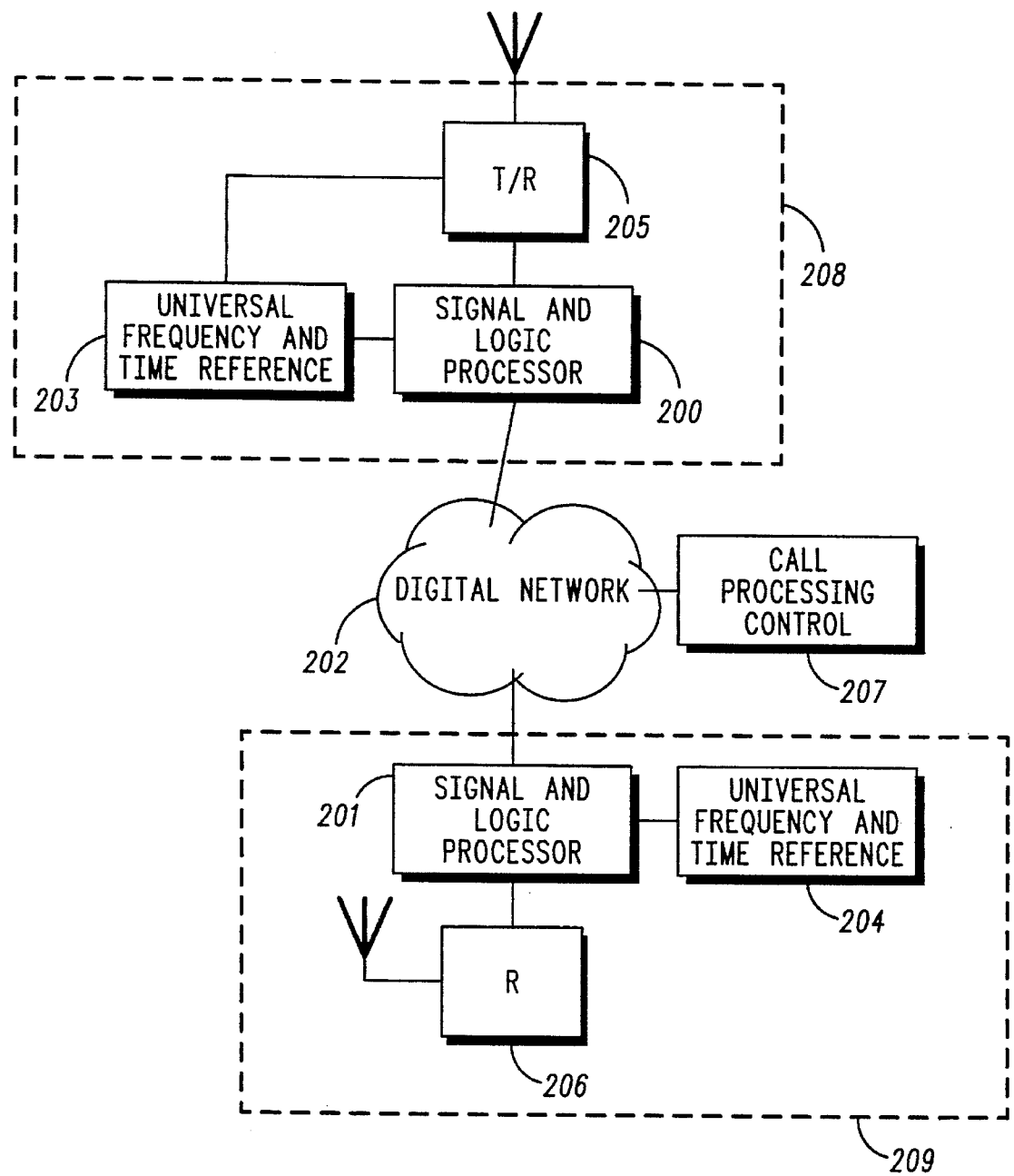
FIG. 2 illustrates a multi-site communication system that may incorporate the present invention.

FIG. 2 illustrates the same simulcast communication system 100 as FIG. 1 but with a focus on site equipment coupled to the digital communication network 202. A first simulcast site 208, comprises at least one signal and logic processor 200, at least one base station transceiver 205, and at least one universal frequency and time reference 203. The signal and logic processor 200 may comprise an IntelliRepeater Station Control Board as manufactured by Motorola Inc. A second site 209 also comprises a signal and logic processor 201, a universal frequency and time reference 204, and a base station 206 that, for illustration of possible site configuration purposes, contains only a receiver. The first and second sites 208 and 209 are operably connected to all other sites via the digital communication network 202. The digital communication network 202 carries both communication message payloads and control messages to establish communication. The digital communication network 202 may comprise time-variant delay links, such as those provided by public switching networks such as the public telephone switching network (PTSN). Often these type of links are provided with lower tariffs than those that are time-invariant, making them more attractive for use in simulcast communication systems. However, the links are often re-routed in these networks due to traffic overload or failures. The new route may take a completely different path through different links and switches, even through Earth orbit satellites, and thus have a significantly different delay.

The call processing controller 207 is operably connected to the digital communication network 202 to direct call establishment activity. The call processing controller 207 may comprise a central or zone controller as is known, or a communication resource allocator which is also known. Note that each radio network or sub-network must include at least one call processing controller at any network node to establish communication between two or more communication units and network users. Further note that there may be multiple call processing controllers at different nodes in the network such that each call processing controller takes responsibility for different sub-networks of the network, where a sub-network is any subset of the total network nodes. Still further note that there is no requirement that a call processing controller be responsible for the site at which it is located. For example, a network consisting of many nodes which are considered to encompass several sub-networks, may have all call processing controllers located at the same node.

Figure 3:
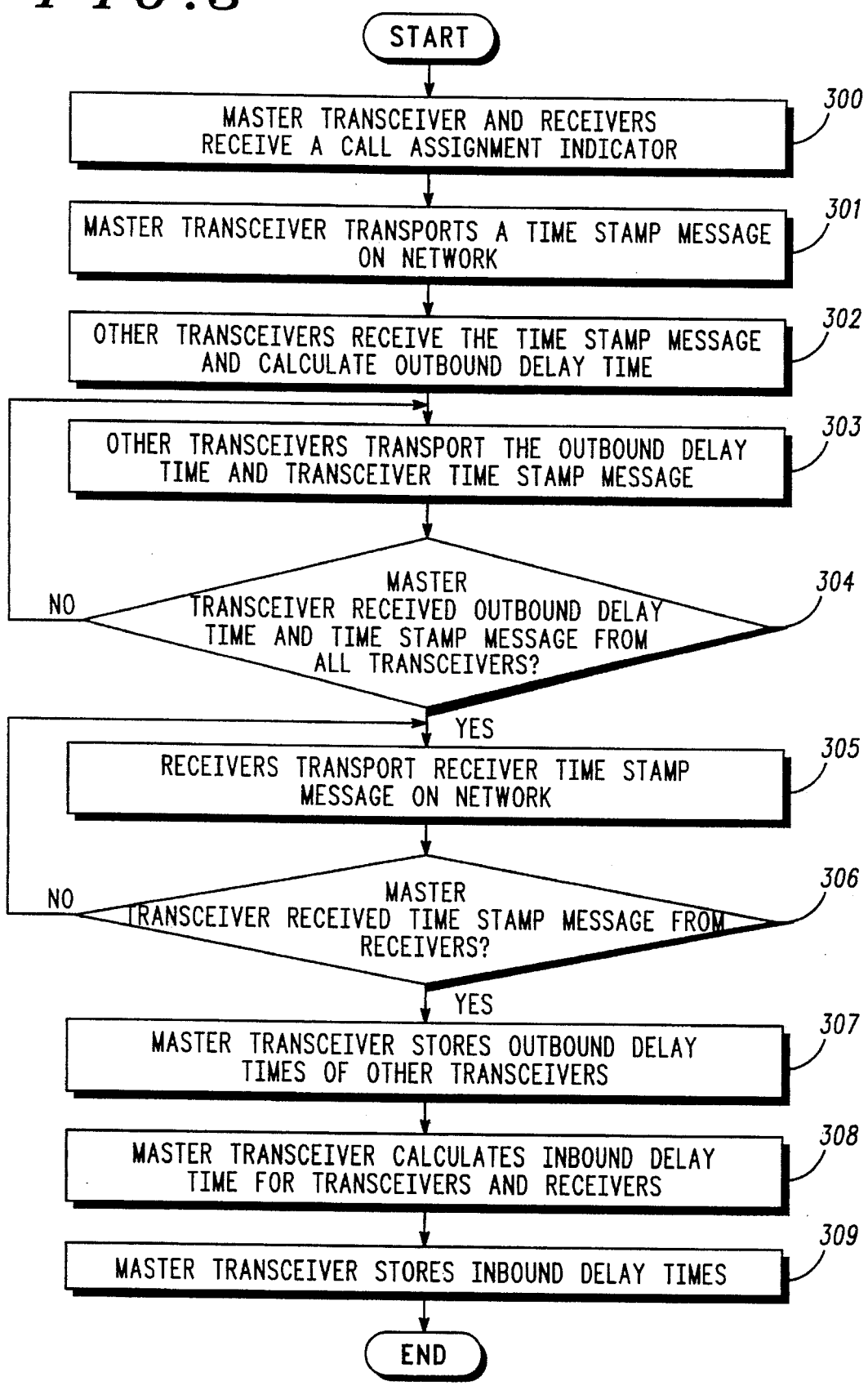
FIG. 3 illustrates a flow diagram for link delay determination processing by the master transceiver and remote site transceiver in accordance with the present invention.

FIG. 3 illustrates a flow diagram that may be implemented by a master and remote site transceivers for link delay determination processing. Link delay determination for all links to and from remote transceivers involved in a call is carried out by the chosen master transceiver assigned to the call. At step 300, a call assignment indicator, via the digital communication network, is received by the assigned master transceiver and all of the remote site transceivers (or receivers) assigned to the call. The call assignment indicator typically comes from a call processing controller as part of the resource assignment phase of a communication session, after the call processing controller receives a request for service. The call assignment and indication thereof is known, thus no further discussion will be presented.

The master transceiver produces and transports a time stamp message to each transceiver associated with the call 301. The time stamp message contains a time stamp denoting time when the message enters the digital communication network. The time stamp is typically determined by adding a short fixed offset, compensating for the time needed to produce the message and for it to enter the digital network, to the absolute time provided by the universal time and frequency reference.

The remote site transceivers receive the time stamp message and use the time stamp to calculate an outbound delay time 302. The outbound delay time is the amount of time it took the message to traverse the digital communication network in the outbound direction (direction from the master transceiver to the remote site). The outbound delay time is generally calculated by subtracting the time stamp value carried in the message from the present absolute time provided by the local frequency and time reference minus a fixed compensation offset for message decode time. The resulting time is the outbound link delay from the master transceiver to the remote site transceiver. The calculated outbound delay time is then placed in a transceiver time stamp message along with a new time stamp for measuring the return path, and transported back to the master transceiver via the digital communication network 303. The new time stamp contained in the transceiver time stamp message may be determined in the same way as the outbound time stamp by adding a time offset, compensating for the time needed for the message to enter the network, to the local absolute time provided by the frequency and time reference.

After transmitting the time stamp message, the master transceiver awaits receipt of the transceiver time stamp messages from each of the other remote transceivers 304. After all the remote transceivers have responded, the master transceiver stores the calculated outbound delay times from each of the remote site transceivers 307. While the master transceiver is receiving time stamp messages from transceivers, remote sites that are composed of only receivers send receiver time stamp messages to the master transceiver 305. The remote sites that contain only receivers transports the receiver time stamp message to the master transceiver after they receive the call assignment indicator from the call processing controller. The time stamp that the receivers send may be determined, using the local frequency and time reference's absolute time information, in the same manner as that described above by the transceivers.

After all the remote receivers have responded 306, the master transceiver calculates an inbound delay time for each of the remote transceivers and receivers assigned to the call 308. The inbound delay time is the amount of time it took the message to traverse the digital communication network in the inbound direction (direction from the remote site to the master transceiver). The inbound delay time is generally calculated by subtracting the time stamp value contained in the transceiver and receiver time stamp messages from the absolute time of when the time stamp messages were received by the master transceiver minus a time offset to compensate for message decode time. The master transceiver stores the calculated inbound delay times for all remote site transceivers and receivers for later use 309. The maximum inbound delay time will be used in later steps to determine when received signal processing may occur in the master transceiver.

FIG. 4 illustrates a flow diagram that a master transceiver, remote site transceivers and remote site receivers may implement for processing received signals. At step 400, radio frequency (RF) signals are received by transceivers and/or receivers and demodulated to determine the information they carry, wherein the RF signal is transmitted by a communication unit. Note that depending on the communication unit's physical location and RF propagation characteristics, some or all of the transceivers or receivers assigned to the call may not receive a signal at all times during the call. Each transceiver and receiver that receives the signal transports the received signal and a signal time stamp message to the master transceiver via the digital communication network 401. The time stamp normally correlates the received signal with the time that it was received (time of arrival) which is determined from the local frequency and time reference. To prepare the received signal for transporting to the master site, the receiving entity (receiver or transceiver) converts the received signal into a received message digital format compatible for transport onto the digital communication network and compatible for reception from the digital communication network by the master transceiver. The digital format may be compressed and packetized to reduce the digital communication network bandwidth requirements. Such signal preparation is known, thus no further discussion will be presented.

Upon receiving the prepared signals and time stamps, the master transceiver temporarily stores them for processing 402. Processing does not occur until all received signal messages that were sent have been received by the master transceiver. As mentioned, not all of the transceivers and receivers may have messages to send since they may not be within the coverage range of a transmitting communication unit at that moment, so it is not sufficient to simply wait for messages from every receiver equipped site before processing the messages. Instead, the delay in processing is determined by calculating a wait period 403. The wait period may be calculated and stored ahead of time, either at the time of the call assignment, or at some other appropriate time.. In either case, the wait period is based on the greatest of the inbound delay times that were calculated previously in step 308 of FIG. 3, plus an offset to compensate for message decode time. During the period before the calculated wait time expires 404, any remaining received signal messages that arrive from other transceivers or receivers on the digital communication network are stored 405. This ensures that messages from any receiver that had a message to send was received.

After the wait time has expired 404, the master transceiver selects the received signal to be broadcast 406. The signal selection process is discussed in co-pending application having a filing date of Feb. 26, 1993, U.S. application Ser. No. 08/023,982, and is entitled "Simulcast Group Determination of Best Signal By Master Site".

Once the signal has been selected for broadcast, a launch time is determined 407. As previously mentioned, the outbound delay times for the links to each transceiver were stored in step 307 of FIG. 3 and are used to calculate the launch time. The launch time is calculated by adding the greatest calculated outbound delay time plus a fixed amount of time to account for processing delays at the transceivers to the absolute time that the signal message to be broadcast enters the digital communication network. This ensures that all transmitters will have the signal to be transmitted in their transmit buffer before the launch time occurs.

The selected signals to be transmitted, along with the transmit launch time, are prepared and then transported by the master transceiver to the one or more transceiver sites that have been assigned for this transmission 408. Normally the transport will be carried out to each of the transceiver equipped sites involved in this communication where the same assigned frequency is re-used. As was the case with the inbound path, the preparation may include converting the signal information into a digital message format, including compressed or packetized formats, compatible for transport onto the digital communication network and compatible for reception from the network by the assigned transceiver sites.

When the transceivers receive the selected signal and the launch time, the selected signals are broadcasted at the launch time. The launch time is the instant in time when all the universally coordinated transceivers will transmit the same modulation sequence in phase. The selected signal may have to be buffered in a transmit time delay queue memory until the launch time arrives.

From the above, the present invention allows a group of two or more transceivers to receive a communication unit's transmission and broadcast that information on a same simulcast frequency carrier. The simulcast transmission is essentially in-phase and on-frequency so as to maximally utilize the efficiency of a single channel for a multi-site group dispatch communication.

Time varying delay links are accommodated with this invention, including those with a broad range of possible delays, through the method of measuring the outbound and inbound delays continually. Universally coordinated launch times are tuned to the current network configuration, rather than simply determined by a predetermined worst case constant. By not using a prior art star site configuration, the radio network is not susceptible to single site (prime site) failures thus providing a constant grade of service to the users, without the need for switching systems, without the need for duplicate systems, without the need for time invariant distribution links, and without any foreknowledge of time varying link delays.

We claim:

1. In a simulcast communication system that includes a plurality of sites including at least two transceiver sites, a time reference, and a plurality of communication units, and wherein the plurality of sites are operably linked together by a non-star topology digital communication network, a method of determining simulcast delay times for the digital communication network, the method comprising the steps of:

a) receiving, by at least a first of the plurality of sites, an indication of a call assignment on the non-star topology digital communication network to produce a call assignment indicator, which call assignment indicator identifies a master site transceiver;

b) transporting, by the identified master transceiver site, a time stamp message on to the non-star topology digital communication network;

c) receiving, by other transceiver sites of the at least two transceiver sites, the time stamp message;

d) calculating, by each of the other transceiver sites, an outbound delay time, wherein the outbound delay time is based on the time stamp message and time when the time stamp message was received;

e) transporting, by each of the other transceiver sites, the outbound delay time and a transceiver time stamp message to the identified master transceiver site via the non-star topology digital communication network;

f) storing, by the identified master transceiver site, the outbound delay time for each of the other transceiver sites;

g) calculating, by the identified master transceiver site, an inbound delay time for each of the other transceiver sites, wherein the inbound delay time is based on the transceiver time stamp message and time when the transceiver time stamp message was received; and h) storing, by the identified master transceiver site, the inbound delay time for each of the other transceiver sites.

2. The method of claim 1, wherein the simulcast communication system further comprises at least one receiver site having a receiver, the method further comprising the steps of:

i) receiving, by the identified master transceiver site, a receiver time stamp message from the at least one receiver site;

j) calculating, by the identified master transceiver site, an inbound delay time for the at least one receiver site, wherein the inbound delay time is based on the receiver time stamp message and time when the receiver time step message was received; and k) storing, by the identified master transceiver site, the inbound delay time for the at least one receiver site.

3. In a simulcast communication system that includes a plurality of sites including at least two transceiver sites, a time reference, and a plurality of communication units, and wherein the plurality of sites are operably linked together by a non-star topology digital communication network, a method for a transceiver site of the at least two transceiver sites to determine simulcast delay times of the digital communication network, the method comprising the steps of:

a) receiving, from a master transceiver site identified by a call assignment, a time stamp message on the non-star topology digital communication network;

b) upon receiving the time stamp message, calculating, by the transceiver site, an outbound delay time, wherein the outbound delay time is based on the time stamp message and time when the time stamp message was received; and c) transporting, by the transceiver site, the outbound delay time and a transceiver time stamp message to the master transceiver site via the non-star topology digital communication network, such that the master transceiver site calculates an inbound delay time for the transceiver site based on the transceiver time stamp message.

4. In a simulcast communication system that includes a plurality of sites including at least two transceiver sites, a time reference, and a plurality of communication units, wherein at least one of the plurality of sites is a receiver site that includes a receiver, and wherein the plurality of sites are operably linked together by a non-star topology digital communication network, a method of determining simulcast transmit times of received signals, the method comprising the steps of:

a) receiving, by a receiver site or a transceiver site, a signal from a communication unit to produce a received signal;

b) transporting, by the receiver site or the transceiver site, the received signal and a signal time stamp message to an assigned master transceiver site via the non-star topology digital communication network;

c) calculating, by the assigned master transceiver site, a wait period based on calculated inbound delay times for each receiver site and each transceiver site, wherein the assigned master transceiver site waits for a duration of the wait period to receive the received signal from another receiver site or transceiver site;

d) when the wait period expires, selecting when there is more than one received signal, by the assigned master transceiver site, the received signal to broadcast from among the more than one received signal to produce a selected received signal;

e) determining, by the assigned master transceiver site, a launch time based on stored outbound delay times of each transceiver site;

f) transporting, by the assigned master transceiver site via the non-star topology digital communication network, the selected received signal and the launch time to the other transceiver sites of the at least two transceiver sites; and g) transmitting the selected received signal by each of the at least two transceiver sites at the launch time.

5. In the method of claim 4, the calculation of the wait period of step (c) further comprises calculating the wait period to be substantially equal to the stored inbound delay time of the receiver site or transceiver site having greatest stored inbound delay time.

6. In the method of claim 4, the determination of the launch time of step (e) further comprises determining the launch time to be substantially equal to the stored outbound delay time of the transceiver site of the at least two transceiver sites having greatest stored outbound delay time.

* * * * *